United States Patent
Bodduru et al.

(10) Patent No.: US 11,115,951 B2
(45) Date of Patent: Sep. 7, 2021

(54) VIRTUAL BOUNDARY MARKING TECHNIQUES IN BEAMFORMED WIRELESS COMMUNICATIONS

(71) Applicant: QUALCOMM Incorporated, San Diego, CA (US)

(72) Inventors: Appala Naga Raju Bodduru, Hyderabad (IN); Srikanth K.R., Bengaluru (IN); Gaurav Pathak, Hyderabad (IN); Venkata Anantha Subrahmanya Yanamandra Sarma, Hyderabad (IN); Kihak Yi, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/509,885

(22) Filed: Jul. 12, 2019

(65) Prior Publication Data
US 2021/0014820 A1    Jan. 14, 2021

(51) Int. Cl.
*H04W 64/00*    (2009.01)
*H04W 36/00*    (2009.01)
(Continued)

(52) U.S. Cl.
CPC ....... *H04W 64/00* (2013.01); *H04W 36/0061* (2013.01); *H04W 36/06* (2013.01); *H04W 48/16* (2013.01); *H04W 48/20* (2013.01)

(58) Field of Classification Search
CPC ..... H04W 64/00; H04W 48/20; H04W 48/16; H04W 36/0061; H04W 36/06; H04W 64/003; H04W 24/08; H04W 48/04
See application file for complete search history.

(56) References Cited

U.S. PATENT DOCUMENTS 6,014,564 A *  1/2000  Donis ................ H04Q 11/0478
                                              455/436
8,885,569 B2 * 11/2014  Dinan ................. H04B 7/0456
                                              370/328
(Continued)

FOREIGN PATENT DOCUMENTS

EP    2549790 A1    1/2013
EP    2747484 A1    6/2014
(Continued)

OTHER PUBLICATIONS

International Search Report and Written Opinion—PCT/US2020/041684—ISA/EPO—dated Dec. 11, 2020.

*Primary Examiner* — Julio R Perez

(57) ABSTRACT

Methods, systems, and devices for wireless communications are described in which a UE receives configuration information indicative of a base station virtual boundary geometry, decodes a plurality of virtual boundary marking code blocks associated with the configuration information, said decoding based on UE eigenvector information, and determines to establish communications with the base station within the base station virtual boundary geometry. A base station determines configuration information indicative of a base station virtual boundary geometry, the configuration information associated with accumulated measured and reported key performance parameters of a plurality of user equipment, transmits the configuration information to at least one UE, wherein the configuration information comprises a plurality of virtual boundary marking code blocks and attempts to establish communications with the at least one user equipment.

25 Claims, 15 Drawing Sheets

(51) Int. Cl.
*H04W 36/06* (2009.01)
*H04W 48/16* (2009.01)
*H04W 48/20* (2009.01)

(56) References Cited

U.S. PATENT DOCUMENTS

| | | | |
|---|---|---|---|
| 9,084,260 B2* | 7/2015 | Maltsev | H04W 72/0453 |
| 10,206,117 B2* | 2/2019 | Damnjanovic | H04W 16/14 |
| 10,523,354 B2* | 12/2019 | Si | H04L 27/2613 |
| 2004/0104841 A1 | 6/2004 | Syrjarinne | |
| 2013/0084884 A1 | 4/2013 | Teyeb et al. | |
| 2013/0212204 A1 | 8/2013 | Kearney, III | |
| 2015/0257027 A1* | 9/2015 | Bodduru | H04L 5/14 |
| | | | 370/280 |
| 2015/0372740 A1* | 12/2015 | Ko | H04B 7/0456 |
| | | | 370/329 |
| 2016/0073301 A1* | 3/2016 | Yanagisako | H04W 36/0079 |
| | | | 455/436 |
| 2017/0026938 A1* | 1/2017 | Onggosanusi | H04L 5/0051 |
| 2017/0149660 A1* | 5/2017 | Shu | H04L 47/28 |
| 2017/0270951 A1* | 9/2017 | Ekambaram | G06K 9/00 |
| 2017/0331670 A1* | 11/2017 | Parkvall | H04W 52/0245 |
| 2017/0332359 A1* | 11/2017 | Tsai | H04B 7/0617 |
| 2017/0347277 A1* | 11/2017 | Zhang | H04W 16/32 |
| 2018/0020382 A1* | 1/2018 | Kim | H04W 72/042 |
| 2018/0152848 A1* | 5/2018 | Egner | H04W 76/18 |
| 2018/0248642 A1* | 8/2018 | Si | H04J 11/0079 |
| 2018/0262266 A1 | 9/2018 | Ravishankar et al. | |
| 2018/0343635 A1* | 11/2018 | Edge | G01S 19/06 |
| 2018/0368016 A1* | 12/2018 | Lee | H04W 24/10 |
| 2019/0053136 A1* | 2/2019 | Lee | H04W 88/06 |
| 2019/0053175 A1* | 2/2019 | Kubota | H04W 56/001 |
| 2019/0081690 A1* | 3/2019 | Mueck | H04B 7/086 |
| 2019/0090185 A1* | 3/2019 | Rune | H04B 7/0617 |
| 2019/0174395 A1* | 6/2019 | Choe | H04W 48/16 |
| 2019/0174567 A1* | 6/2019 | Kusashima | H04W 72/0406 |
| 2019/0174571 A1* | 6/2019 | Deenoo | H04W 76/28 |
| 2019/0187236 A1* | 6/2019 | Ylamurto | G01S 5/021 |
| 2019/0199457 A1* | 6/2019 | Chopra | H04B 17/309 |
| 2019/0230580 A1* | 7/2019 | Kim | H04L 5/0051 |
| 2019/0268819 A1* | 8/2019 | Kim | H04W 24/10 |
| 2019/0364492 A1* | 11/2019 | Azizi | H04W 24/08 |
| 2019/0394700 A1* | 12/2019 | Lekutai | H04W 40/22 |
| 2020/0204801 A1* | 6/2020 | Hu | H04N 19/423 |

FOREIGN PATENT DOCUMENTS

| | | |
|---|---|---|
| EP | 3070972 A1 | 9/2016 |
| WO | WO-2010101547 A1 | 9/2010 |

* cited by examiner

VIRTUAL BOUNDARY MARKING TECHNIQUES IN BEAMFORMED WIRELESS COMMUNICATIONS

BACKGROUND

The following relates generally to wireless communications, and more specifically to virtual boundary marking techniques in beamformed wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

A base station and UE may establish a connection using one or more beamformed transmission beams. A beam sweeping procedure between a base station and a UE may be enabled to find the best beam between the base station and UE. Based on the base station coverage area, a base station may perform handoff and fallback procedures as the UE travels through the network. In some cases, beam scanning may be hindered due to multiple blockages and a UE may appear to be in a shadow region. Hence, such UEs are not able to access or camp agnostically to a network (e.g. 5G). This may lead to UE power drainage and poor system performance. Efficient techniques for positional awareness enable beams to be directed towards each other. This may help enhance system efficiency. In some cases, network (e.g. 5G) coverage may be irregular and there may be significant imbalance between a downlink and an uplink. Techniques for positional awareness and real time determination of base station boundaries for scanning, acquistion and attach procedures may help optimize beamformed communications.

SUMMARY

A method of wireless communication at a UE is described. The method may include receiving configuration information indicative of a base station virtual boundary geometry, decoding a plurality of virtual boundary marking code blocks (VBMCB) associated with the configuration information, said decoding based on UE eigenvector information and determining to establish communications with the base station within the base station virtual boundary geometry. In some examples, the UE eigenvector information may inlude at least one of azimuth angle, elevation angle, propagation time delay or distance from a cell center. In examples, virtual boundary marking code blocks are associated with a non-standalone idle mode. In other examples, the virtual boundary marking code blocks may be received in an RRC message associated with a non-standalone connected mode. In examples, the UE may flexibly select between the SIB having reserved bits allocated for virtual boundary marking or a different SIB (SIBx) comprising virtual marking code blocks. In some examples, the VBMCB is received in a SIB associated with a standalone idle mode. In other examples, the VBMCB is received in an RRC Reconfiguration message associated with a standalone connected mode. In examples, the UE may determine to attempt acquisition of a 5G base station based on the VBMCB.

An apparatus for wireless communication at a UE is described. The apparatus may include a processor, memory in electronic communication with the processor, and instructions stored in the memory. The instructions may be executable by the processor to cause the apparatus to receive configuration information indicative of a base station virtual boundary geometry, decode a plurality of virtual boundary marking code blocks (VBMCB) associated with the configuration information, said decoding based on UE eigenvector information and determining to establish communications with the base station within the base station virtual boundary geometry. In examples, the UE eigenvector information may include at least one of azimuth angle, elevation angle, propagation time delay or distance from a cell center. In some examples, virtual boundary marking code blocks may be associated with a non-standalone idle mode. In examples, the virtual boundary marking code blocks may be received in an RRC message associated with a non-standalone connected mode. In examples, the UE may flexibly select between the SIB having reserved bits allocated for virtual boundary marking or a different SIB (SIBx) comprising virtual marking code blocks. In examples, the VBMCB is received in a SIB associated with a standalone idle mode. In examples, the VBMCB is received in an RRC Reconfiguration message associated with a standalone connected mode. In examples, the UE may determine to attempt acquisition of a 5G base station based on the VBMCB.

Another apparatus for wireless communication at a UE is described. The apparatus may include means for receiving configuration information indicative of a base station virtual boundary geometry, means for decoding a plurality of virtual boundary marking code blocks (VBMCB) associated with the configuration information, said means for decoding based on UE eigenvector information and means for determining to establish communications with the base station within the base station virtual boundary geometry. In examples, the UE eigenvector information may inlude at least one of azimuth angle, elevation angle, propagation time delay or distance from a cell center. In examples, virtual boundary marking code blocks may be associated with a non-standalone idle mode. In aspects, the virtual boundary marking code blocks may be received in an RRC message associated with a non-standalone connected mode. In some examples, the UE may include means for flexibly selecting between the SIB having reserved bits allocated for virtual boundary marking or a different SIB (SIBx) comprising virtual marking code blocks. In examples, the VBMCB is received in a SIB associated with a standalone idle mode. In examples, the VBMCB is received in an RRC Reconfiguration message associated with a standalone connected mode. In examples, the UE may determine to attempt acquisition of a 5G base station based on the VBMCB.

A non-transitory computer-readable medium storing code for wireless communication at a UE is described. The code may include instructions executable by a processor to receive configuration information indicative of a base station virtual boundary geometry, decode a plurality of virtual boundary marking code blocks (VBMCB) associated with the configuration information, said decoding based on UE eigenvector information and determining to establish communications with the base station within the base station virtual boundary geometry. In examples, the UE eigenvector information may inlude at least one of azimuth angle, elevation angle, propagation time delay or distance from a cell center. In examples, virtual boundary marking code blocks may be associated with a non-standalone idle mode. In some examples, the virtual boundary marking code blocks may be received in an RRC message associated with a non-standalone connected mode. In some examples, the code may include instructions executable by a processor to flexibly select between the SIB having reserved bits allocated for virtual boundary marking or a different SIB (SIBx) comprising virtual marking code blocks. In examples, the VBMCB is received in a SIB associated with a standalone idle mode. In examples, the VBMCB is received in an RRC Reconfiguration message associated with a standalone connected mode. In examples, the UE may determine to attempt acquisition of a 5G base station based on the VBMCB.

A method of wireless communication at a base station is described. The method may include determining configuration information indicative of a base station virtual boundary geometry, the configuration information associated with accumulated measured and reported key performance index (KPI) parameters of a plurality of user equipment (UE), transmitting the configuration information to at least one UE, wherein the configuration information comprises a plurality of virtual boundary marking code blocks, and attempting to establish communications with the at least one user equipment. The base station may encode the plurality of VBMCB into a system information block (SIBx) with the accumulated UE KPI matrix information, and transmit the encoded plurality of VBMCB in the SIBx in a non-standalone idle mode. The base station may encode the plurality of VBMCB into an RRC reconfiguration message with the accumulated UE KPI matrix information and transmit the encoded plurality of VBMCB in the RRC reconfiguration message in a non-standalone connected mode. In some examples, the base station may encode the plurality of VBMCB into a system information block (SIBx) with accumulated UE KPI matrix information and transmit the encoded plurality of VBMCB in the SIBx in a standalone idle mode. In some examples, the base station may encode the plurality of VBMCB into an RRC Reconfiguration message with accumulated UE KPI matrix information and transmit the encoded plurality of VBMCB in the RRC Reconfiguration message in a standalone connected mode. In yet other examples, the base station may flexibly select between a SIB having reserved bits allocated for virtual boundary marking or a different SIB (SIBx) comprising virtual marking code blocks.

An apparatus for wireless communication at a base station is described. The apparatus may include a processor, memory in electronic communication with the processor, and instructions stored in the memory. The instructions may be executable by the processor to cause the apparatus to determine configuration information indicative of a base station virtual boundary geometry, the configuration information associated with accumulated measured and reported key performance index (KPI) parameters of a plurality of user equipment (UE), transmit the configuration information to at least one UE, wherein the configuration information comprises a plurality of virtual boundary marking code blocks, and attempt to establish communications with the at least one user equipment. In examples, the instructions may be executable by the processor to cause the apparatus to encode the plurality of VBMCB into a system information block (SIBx) with the accumulated UE KPI matrix information, and transmit the encoded plurality of VBMCB in the SIBx in a non-standalone idle mode. In examples, the instructions may be executable by the processor to cause the apparatus to encode the plurality of VBMCB into an RRC Reconfiguration message with the accumulated UE KPI matrix information and transmit the encoded plurality of VBMCB in the RRC Reconfiguration message in a non-standalone connected mode. In some examples, the instructions may be executable by the processor to cause the apparatus to encode the plurality of VBMCB into a system information block (SIBx) with accumulated UE KPI matrix information and transmit the encoded plurality of VBMCB in the SIBx in a standalone idle mode. In some examples, the instructions may be executable by the processor to cause the apparatus to encode the plurality of VBMCB into an RRC Reconfiguration message with accumulated UE KPI matrix information and transmit the encoded plurality of VBMCB in the RRC Reconfiguration message in a standalone connected mode. In yet other examples, the instructions may be executable by the processor to cause the apparatus to flexibly select between a SIB having reserved bits allocated for virtual boundary marking or a different SIB (SIBx) comprising virtual marking code blocks.

Another apparatus for wireless communication at a base station is described. The apparatus may include means for determining configuration information indicative of a base station virtual boundary geometry, the configuration information associated with accumulated measured and reported key performance index (KPI) parameters of a plurality of user equipment (UE), means for transmitting the configuration information to at least one UE, wherein the configuration information comprises a plurality of virtual boundary marking code blocks, and means for attempting to establish communications with the at least one user equipment. The base station may include means for encoding the plurality of VBMCB into a system information block (SIBx) with the accumulated UE KPI matrix information, and means for transmitting the encoded plurality of VBMCB in the SIBx in a non-standalone idle mode. In examples, the base station may include means for encoding the plurality of VBMCB into an RRC Reconfiguration message with the accumulated UE KPI matrix information and means for transmitting the encoded plurality of VBMCB in the RRC Reconfiguration message in a non-standalone connected mode. In some examples, the base station may encode the plurality of VBMCB into a system information block (SIBx) with accumulated UE KPI matrix information and transmit the encoded plurality of VBMCB in the SIBx in a standalone idle mode. In some examples, the base station may include means for encoding the plurality of VBMCB into an RRC Reconfiguration message with accumulated UE KPI matrix information and means for transmitting the encoded plurality of VBMCB in the RRC Reconfiguration message in a standalone connected mode. In yet other examples, the base station may include means for flexibly selecting between a SIB having reserved bits allocated for virtual boundary marking or a different SIB (SIBx) comprising virtual marking code blocks.

A non-transitory computer-readable medium storing code for wireless communication at a base station is described. The code may include instructions executable by a processor to determine configuration information indicative of a base station virtual boundary geometry, the configuration information associated with accumulated measured and reported key performance index (KPI) parameters of a plurality of user equipment (UE), transmit the configuration information to at least one UE, wherein the configuration information comprises a plurality of virtual boundary marking code blocks, and attempt to establish communications with the at least one user equipment. In examples, the base station may include instructions executable by a processor to encode the plurality of VBMCB into a system information block (SIBx) with the accumulated UE KPI matrix information, and transmit the encoded plurality of VBMCB in the SIBx in a non-standalone idle mode. In some examples, the base station may include instructions executable by a processor to encode the plurality of VBMCB into an RRC Reconfiguration message with the accumulated UE KPI matrix information and transmit the encoded plurality of VBMCB in the RRC Reconfiguration message in a non-standalone connected mode. In some examples, the base station may include instructions executable by a processor to encode the plurality of VBMCB into a system information block (SIBx) with accumulated UE KPI matrix information and transmit the encoded plurality of VBMCB in the SIBx in a standalone idle mode. In some examples, the base station may include instructions executable by a processor to encode the plurality of VBMCB into an RRC Reconfiguration message with accumulated UE KPI matrix information and transmit the encoded plurality of VBMCB in the RRC Reconfiguration message in a standalone connected mode. In yet other examples, the base station may include instructions executable by a processor to flexibly select between a SIB having reserved bits allocated for virtual boundary marking or a different SIB (SIBx) comprising virtual marking code blocks.

In some examples of the method, apparatuses, and non-transitory computer-readable medium described herein, the dependent lang here. In some examples of the method, apparatuses, and non-transitory computer-readable medium described herein, the dependent lang here. In some examples of the method, apparatuses, and non-transitory computer-readable medium described herein, the dependent lang here. In some examples of the method, apparatuses, and non-transitory computer-readable medium described herein, the dependent lang here.

DETAILED DESCRIPTION

Various aspects of the present disclosure relate to methods, systems, devices, and apparatuses that support virtual boundary marking techniques in beamformed wireless communications between a user equipment (UE) and a base station. In some cases, a base station and a UE may establish a connection using one or more beamformed transmission beams. A base station may perform beam sweeping in order to find a UE, and a UE may monitor and select the strongest or best beam transmitted from the base station to establish the connection. Based on the base station coverage area, a base station may perform handoff and fallback procedures as the UE travels through the network.

In some cases, beam scanning may be hindered due to multiple blockages and a UE may appear to be in a shadow region. Hence, such UEs are not able to access or camp agonistically to a network (e.g. 5G). A UE may be unaware it is in a shadow region or may be unaware of blockages in a beam scanning path and it may continue to attempt to acquire access to a network. This results in unnecessary power drainage.

In some cases, network (e.g. 5G) coverage may be irregular and there may be significant imbalance between a downlink and an uplink.

In some scenarios, a UE may download information such as an accumulated history of a network's coverage boundary in order to determine whether or not to attempt to access a network. This information may be in the form of a map or bit map and downloading this information may result in unnecessary power drainage.

Techniques for positional awareness and real time determination of base station boundaries for scanning, acquistion and attach procedures optimize beamformed communications. Positional awareness enables the optimal direction of beams towards a UE. Virtual boundary marking techniques enable real time evaluation of active base station boundaries in a manner that optimizes UE power. Accordingly, techniques such as discussed herein may enhance beam scanning and connection procedures, increase system capacity and optimize UE power.

Aspects of the disclosure are initially described in the context of a wireless communications system. Aspects of the disclosure are further illustrated by and described with reference to apparatus diagrams, system diagrams, and flowcharts that relate to virtual boundary marking techniques in beamformed wireless communications.

Figure 1:
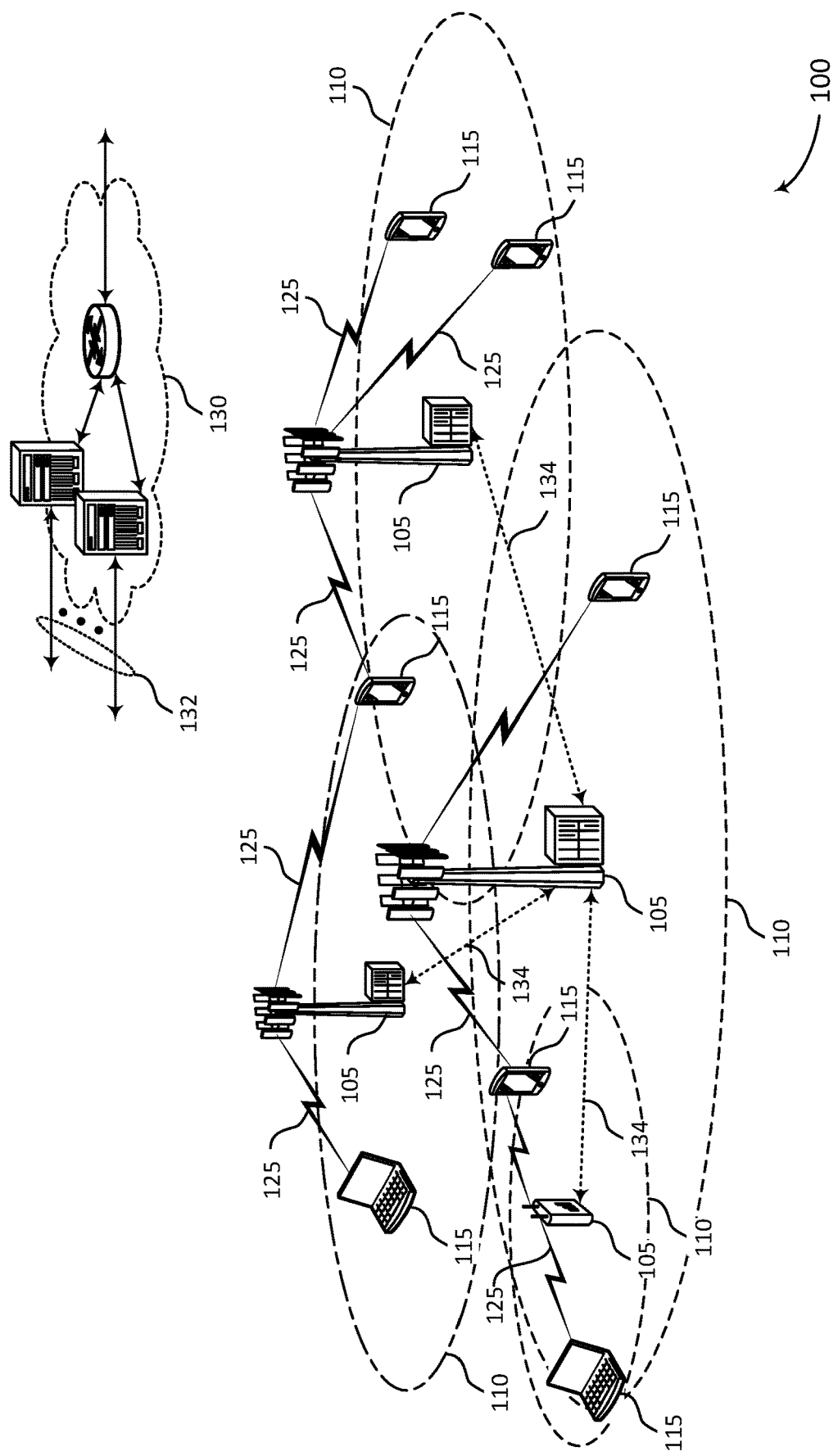
FIG. 1 illustrates an example of a system for wireless communications that supports virtual boundary marking techniques in beamformed wireless communications in accordance with aspects of the present disclosure.

FIG. 1 illustrates an example of a wireless communications system 100 that supports beam update techniques in beamformed wireless communications in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some cases, a UE 115 and base station 105 may use beamformed transmissions for uplink and downlink communications. In such cases, beam update procedures may be conducted to maintain reliable communications. In some cases, a UE 115 may transmit an indication to a base station 105 that the UE 115 supports a beam update procedure that is initiated by a MAC-CE communication. The UE 115 in such cases may receive a MAC-CE communication that triggers the beam update procedure, and perform the beam update procedure, based on the MAC-CE communication, to update one or more beamforming parameters. The base station 105 that is serving the UE 115 may identify that the UE 115 is capable of triggering a beam update through a MAC-CE communication, and may use such a MAC-CE communication to trigger a beam update in the event that a beam used for communications has degraded (e.g., when a reference signal received power (RSRP) drops below a threshold value).

Figure 2:
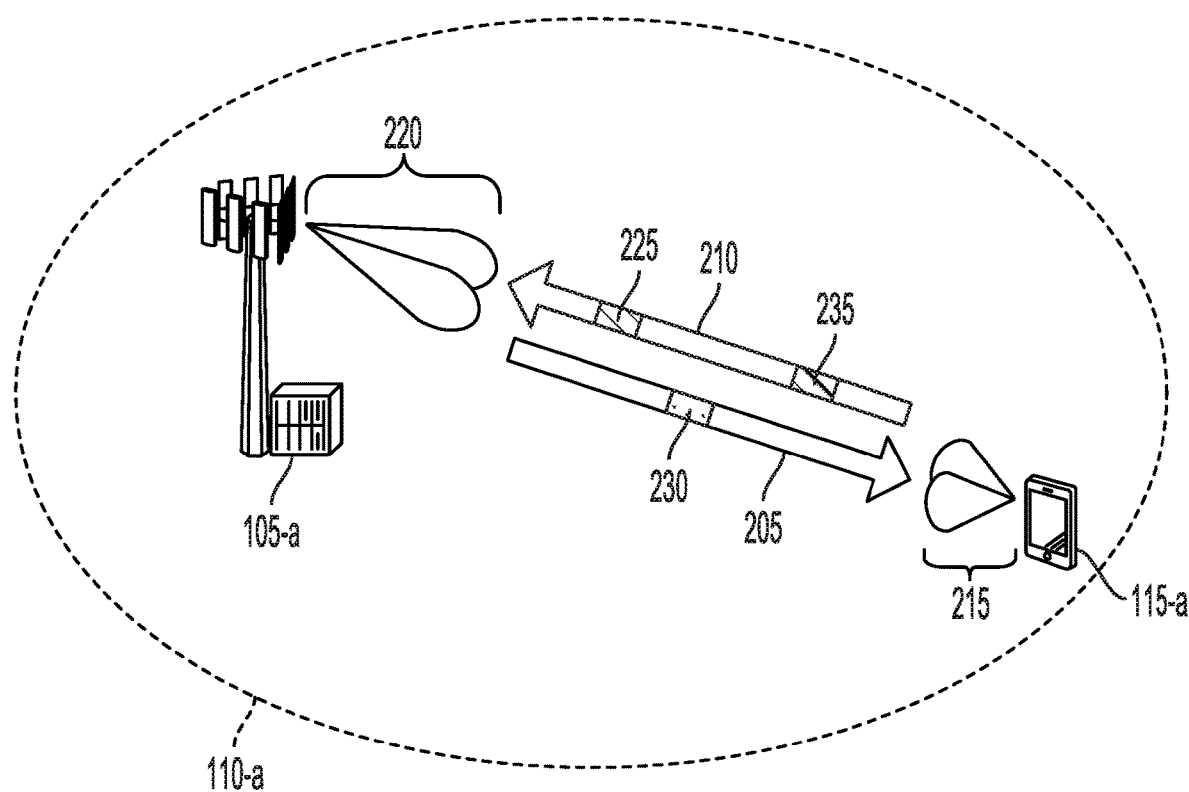
FIG. 2 illustrates an example of a wireless communications system that supports virtual boundary marking techniques in beamformed wireless communications in accordance with aspects of the present disclosure.

FIG. 2 illustrates an example of a wireless communications system 200 that supports virtual boundary marking techniques in beamformed wireless communications in accordance with aspects of the present disclosure. In some examples, wireless communications system 200 may implement aspects of wireless communication system 100. In the example of FIG. 2, wireless communications system 200 may include base station 105-A and UE 115-a, which may be examples of the corresponding devices described with respect to FIG. 1. Base station 105-A may provide network coverage for geographic coverage area or coverage area 110-a. In this example, UE 115-a and base station 105-A may use beamformed communications to establish a downlink connection 205 via a downlink beam 220 and an uplink connection 210 via an uplink beam 215.

In examples, base station 105-A and UE 115-a may establish communication via a beam pair link. In some cases, the UE 115-a and base station 105-A may use corresponding beamforming parameters (e.g., spatial transmission or receive parameters) associated with a particular transmission beam to configure wireless communication hardware for transmitting/receiving beamformed transmissions in which a beam pair link may have coupled transmission beams with corresponding beamforming parameters. In some examples, uplink beams and downlink beams may be uncoupled. The beamforming parameters may include a particular spatial domain filter for uplink or downlink communications that is associated with a particular transmission beam. In cases with coupled transmission beams, the beamforming parameters of an uplink beam may be determined based on one or more reference signals that are received on a selected downlink beam which is quasi co-located (QCL) with the uplink beam. Two antenna ports are said to be QCL if properties of the channel over which a symbol on one antenna port is conveyed can be inferred from the channel over which a symbol on the other antenna port is conveyed.

In some examples, one or more beam pair links may be established through a beam sweep and beam refinement procedure in which the UE 115-a may measure one or more reference signals from the base station 105-A (e.g., channel state information reference signal (CSI-RS) transmissions) and provide measurement reports to the base station 105-A that are used to determine the beam pair links (BPL). Systems that employ transmission beams may use measurements related to multiple beams to identify a best, or most preferred beam to use in a BPL. For example, a first wireless device (e.g., base station 105-A) may perform a beam sweep (e.g., a P1 beam training procedure) in which consecutive beams having a relatively wide beam width are transmitted and may be measured at a second wireless device (e.g., UE 115-a) to identify a best beam (e.g., a beam with a highest RSRP) and provide an indication to the first wireless device of the preferred beam.

In examples, base station 105-A and UE 115-a may establish communication via a beam pair link associated with configuration information generated by the base station 105-A. In some examples, one or more UEs 115-a in a communication system may transmit measurements 225 e.g. key performance indicators (KPI) to the base station 105-A. The UEs may also send updated or real time measurements 235 e.g. updated KPI to the base station 105-A. The base station 105-A may generate and transmit configuration information 230 to the UE-115-a based on UE 115-a KPI information.

Figure 3:
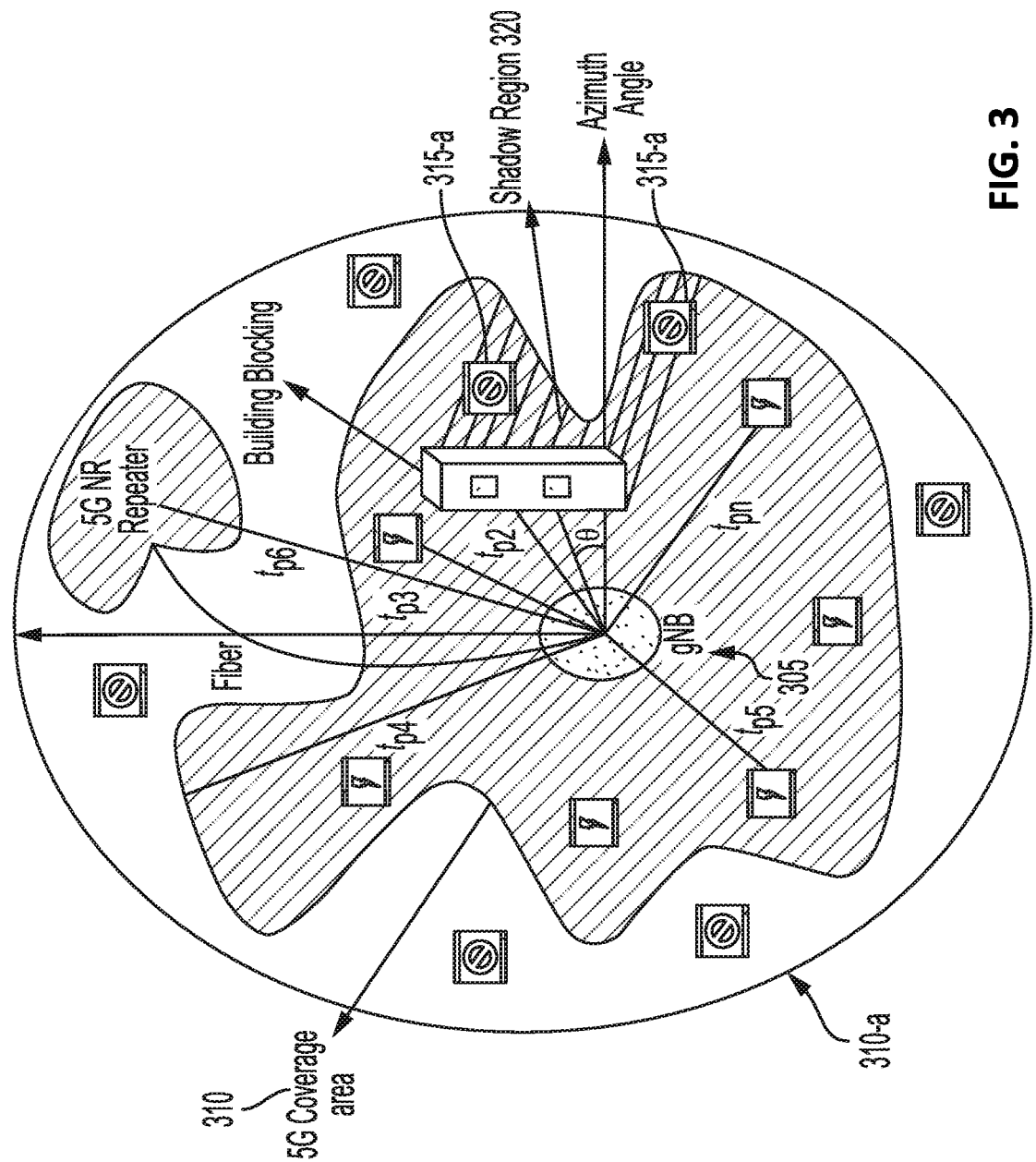
FIG. 3 illustrates an example coverage area in a wireless communications system that supports virtual boundary marking techniques in beamformed wireless communications in accordance with aspects of the present disclosure.

FIG. 3 illustrates an example 2D geometry of a gNB 5G coverage boundary. As illustrated, the coverage boundary 310 may include a shadow region 320 e.g, caused by a tall building. In some cases, a beam or several beams or a potentially preferred beam transmitted by a base station (gNB 305) may be blocked. Thus, a UE 315-a may be considered to be located in the shadow region 320. In some cases, multiple blockages may exist in a beam scanning path. A UE 315-a may be unaware that it is located in a shadow region or that it is experiencing multiple blockages and may repeatedly attempt to acquire access to the network. The time and effort required for repeated attempts by the UE 315-a to acquire access to the network may result in UE power drainage. Thus, in order to optimize beam scanning resources and save UE power, disclosed examples provide for enabling a UE to maintain a high correlation with transmitted beams. Disclosed examples provide techniques for real time evaluation of active base station boundaries. As discussed further, positional awareness allows for beams to be more efficiently directed towards a UE.

Disclosed examples include methods for determining a virtual coverage boundary of a base station. An exemplary scheme determines a virtual coverage boundary based on one or more UE parameters. In disclosed examples, a UE may agnostically decode a base station coverage boundary based on a flag associated with UE parameters such as time delay (TD) or propagation delay (e.g. distance from the base station center) and angle of arrival (AoA). In examples, determining a coverage boundary may comprise determining a physical coverage boundary. In disclosed examples, a UE may determine that it is either within or outside a base station coverage boundary. Thus, a UE may decode the base station boundary and may determine whether or not to attempt to access a network (e.g. a 5G network).

In examples, a base station may have a myriad of possibilities in which a beam may be directed to a UE. FIG. 3 illustrates an exemplary geometry of a 5G coverage boundary. In this example, a theoretical base station coverage boundary 310-a may be different from a 5G coverage area 310. In an aspect of disclosed examples, a 5G coverage island may exist, whereby a 5G repeater enables coverage on the island. In FIG. 3, a somewhat centrally located base station or gNB/eNB may attempt to transmit beams to UEs located within boundary 310-a, 310, 310-b. As illustrated in FIG. 3, an obstruction in a beam path (e.g. a tall building) may create a shadow region where UEs may not be able to access or agnostically camp on a 5G network. As illustrated in FIG. 3, a beam directed towards a UE has positional attributes such as azimuth angle, elevation angle, propagation delay $t_{pn}$, etc. In disclosed examples, these positional attributes or parameters may be used by a base station to encode virtual boundary code blocks formulated as an eigen function matrix. In disclosed examples, a UE may evaluate virtual boundary marking code blocks transmitted by a base station, in order to determine whether or not to acquire a network.

An examplary eigen function matrix is disclosed below:

$$y = H * x$$

$$y = \sum_{k=0}^{n} a^*_{(R,\theta,\varphi)} a^*_{(D,\theta,\varphi)} t_p * x$$

$$H = A^*_{(R,\theta,\varphi)} A^*_{(D,\theta,\varphi)} * T_p$$

where y: Received signal vector x: Transmitted signal vector

H: Eigen Function Matrix $T_p$: Propagation delay $A_{(R,\theta,\varphi)}$: Angle of reception $A_{(D,\theta,\varphi)}$: Angle of departure $$H = \begin{bmatrix} f_{((\theta_1,\varphi_1),t_{p11})} & & f_{((\theta_3,\varphi_1),t_{pn1})} \\ f_{((\theta_2,\varphi_2),t_{p12})} & \cdots & f_{((\theta_2,\varphi_2),t_{pn2})} \\ \vdots & \ddots & \vdots \\ f_{((\theta_{n-1},\varphi_{n-1}),t_{p1(m-1)})} & \cdots & f_{((\theta_{n-1},\varphi_{n-1}),t_{pn(m-1)})} \\ f_{((\theta_n,\varphi_n),t_{p1m})} & & f_{((\theta_n,\varphi_n),t_{pnm})} \end{bmatrix}$$

$f_{((\theta_n,\varphi_n),t_{pnm})}$: Eigen Function for a $(\theta, \varphi)$ and $t_p$ pair As shown in the exemplary eigen function, y is a received signal vector, x is the transmitted signal vector, H is a channel matrix or eigen function matrix, $T_p$ represents propagation delay, $A_{(R, \theta, \varphi)}$ represents angle of reception and $A_{(D, \theta, \varphi)}$ represents angle of departure. The angle of departure and angle of arrival may be from either the UE or BS perpective. For instance, when a base station transmits at an angle θ, AoD=θ. Likewise, a UE may receive a transmitted beam at an angle of arrival, AoA.

In disclosed examples, a base station learns beam positional parameters and creates a matrix based on a plurality of these paramaters. In aspects of disclosed examples, this matrix is updated in real time. Thus, a base station is aware of its coverage across a timeline. In examples, a base station shares the exemplary matrix with the UE and upon decoding variables in the matrix, a UE may determine whether or not it should have network (e.g. 5G) coverage.

In examples, each entry of the eigen function matrix may represent a flag variable that a UE decodes. A single flag, or different combinations of flag variables may be used for a variety of purposes. For example, a flag variable may be indicative of a 5G coverage area; a flag or flag value or flag variables may be used to indicate uplink or downlink information, and/or whether a handover operation is required. In one aspect, a flag variable may include attributes such as network (e.g. 5G) frequency, cell ID, band information, DL and UL imbalance information, etc.

In examples, a flag variable may be transmitted as part of a frame structure, e.g. as part of a System Information Block (SIB). For instance, in the exemplary eigen function above, $f_{(\theta n,\varphi n), tpnm})$ may be encoded to be used as a flag variable. In examples, a global flag in a system information block (SIB) may indicate the co-location of a 5G cell with a 4G cell. However, such a global flag may not provide 5G cell boundary information or whether a UE may access the 5G network. As discussed above, disclosed examples provide for a UE to agnostically decode a 5G or NR base station cell boundary, e.g. based on eigen function matrix variables. The overall frame structure i.e, SIB may be in the form: Boundary_Flag_ijk or Boundary_Attributes [Bands][Cell/Sector][DL/UL Unbalance]. In examples, a flag may be used to indicate the availability of a 5G coverage area. In aspects, a flag value may be different for uplink, downlink or handover operation.

In examples, different parameters may be incorporated into an eigen function matrix. For instance, a base station (gNB) may determine initial boundary coverage based on 2D or 3D polar coordinates. In dislcosed examples, coverage based on 2D polar coordinate assumes an eigen function based on positional parameters related to distance and propagation delay only. Thus, the eigen function may incorporate azimuth angle and propagation delay only. For instance, a 5G NR repeater may be deployed, e.g a hotspot may be deployed to provide 5G coverage for a confined boundary where surrounding areas are not served with 5G. In this scenario, propagation delay distance may be encoded in the eigen function matrix.

For a 3D coordinate based eigen function, an elevation angle may be encoded in the eigen function matrix in addition to the azimuth angle and propagation delay. For instance, it may be desirable to limit or confine a base station coverage boundary, e.g. it may be desired to limit coverage to a $10^{th}$ floor of a 30 floor building. In this case, the determined eigen function matrix may be expressed based on a specific elevation angle. E.g., a matrix may cover 360 degrees in azimuth while elevation angle may be limited to 30, 45 or 60 degrees corresponding to floor levels. Thus, the eigen function may be calculated for every degree of angle, or for 360 combinations for each angle.

In aspects of disclosed examples, a base station may continuously learn from UEs in connected state since these UEs provide key performance indicators (KPIs) such as angle of elevation, angle of azimuth, propagation delay, etc. In other words, a base station may know a user's propagation delay from a certain distance, its angle of elevation and angle of azimuth. The base station may receive updated KPI as the UEs travel through the network. Thus, the base station may maintain a matrix database. In some cases, a matrix database may be based on all users in a communications system.

In some examples, a base station may dynamically modify its coverage matrix based on a change in user density. For instance a base station may detect more users based on received KPI, and may determine to switch beams based on this feedback. In an aspect of disclosed examples, the more users there are in a geographic location, the better the learning by the base station because the base station receives more quantitative and/or qualitative feedback.

In some scenarios, a user or UE may experience penetration loss (e.g. due to entering a building), whereby there may be discontinuity between indoor and outdoor coverage. For instance, a UE on a nearby 5G cell may enter a building resulting in an abrupt decrease in KPI. In such an instance, there is a need for seamless handover. Therefore, in a connected state, a UE may receive a virtual boundary marking flag variable defining a virtual boundary, and the UE will therefore know to trigger handover prior to entering the building. Here, real time agnostic knowledge of a base station virtual boundary enables UE assisted handover and drops may be avoided.

In another aspect of disclosed examples, handover may be required between different levels of a building. For instance, a 5G base station may provide service up to a certain floor in a tall building. Thus, knowledge by the UE of a base station virtual boundary and elevation angle enables the UE to trigger handover, e.g. to a WLAN system providing indoor coverage. In an aspect of disclosed examples, based on receipt of a flag variable, a UE has knowledge of when it may loose 5G coverage or when it is entering a shadow region so it may switch back to a 4G or 3G network in non-standalone mode. In yet another example, coverage awareness allows an operator to confine coverage to a specific geographic area, for instance, to within e.g. 3000 sq feet or 2000 sq feet of a flat/apartment/house. In some examples, coverage may be confined to prevent spillover. For instance, it may be determined to provide coverage inside a stadium (e.g. during a game), whereas UE's outside the stadium are denied coverage. Outside of a defined footprint or confined area, a UE may be denied access since it is not able to decode a coverage defining eigen function.

Non-standalone mode in 5G NR may refer to an option of 5G NR deployment that depends on the control plane of an existing LTE network for control functions, while 5G NR focuses on the user plane. In non-standalone mode, a 4G network may act as an anchor network that the UE switches to. In other words, in non-standalone mode, a 4G network may assist a UE in camping on 5G. In this scenario, it is beneficial to enable methods for coverage boundary markings. In some examples, a base station may share virtual boundary marking code blocks, or an eigen function matrix with a UE. This may be broadcast to UEs in the communication system. A UE in turn, may decode and store information such as eigen function matrix information to determine at least one flag. The flag indicates whether the UE should attempt to camp on 5G or not.

In examples, this information may be received at the UE as a system information block. In some examples, an existing SIB may be expanded with new information. In other examples, a new SIB may be utilized. The new SIB comprises VBMCB information, so a UE may evaluate a virtual boundary and it can decide whether or not to camp on 5G.

In aspects, the SIB may be flexibly selected. In examples, reserved bit mapping or reserved bits of the base station may broadcast the flag variable(s).

In some examples, coverage awareness may be used to simplify geo-fencing scenarios. In geo-fencing, a virtual boundary may be created by means of a global positioning system (GPS) or Cell ID technology. In geo-fencing, large amounts of data having a database ID or some other ID may need to be stored on a device. This may be cumbersome and time consuming. Disclosed examples reduce the need to store large amounts of data since coverage boundary is determined agnostically based on decoded eigen vector.

Figure 4:
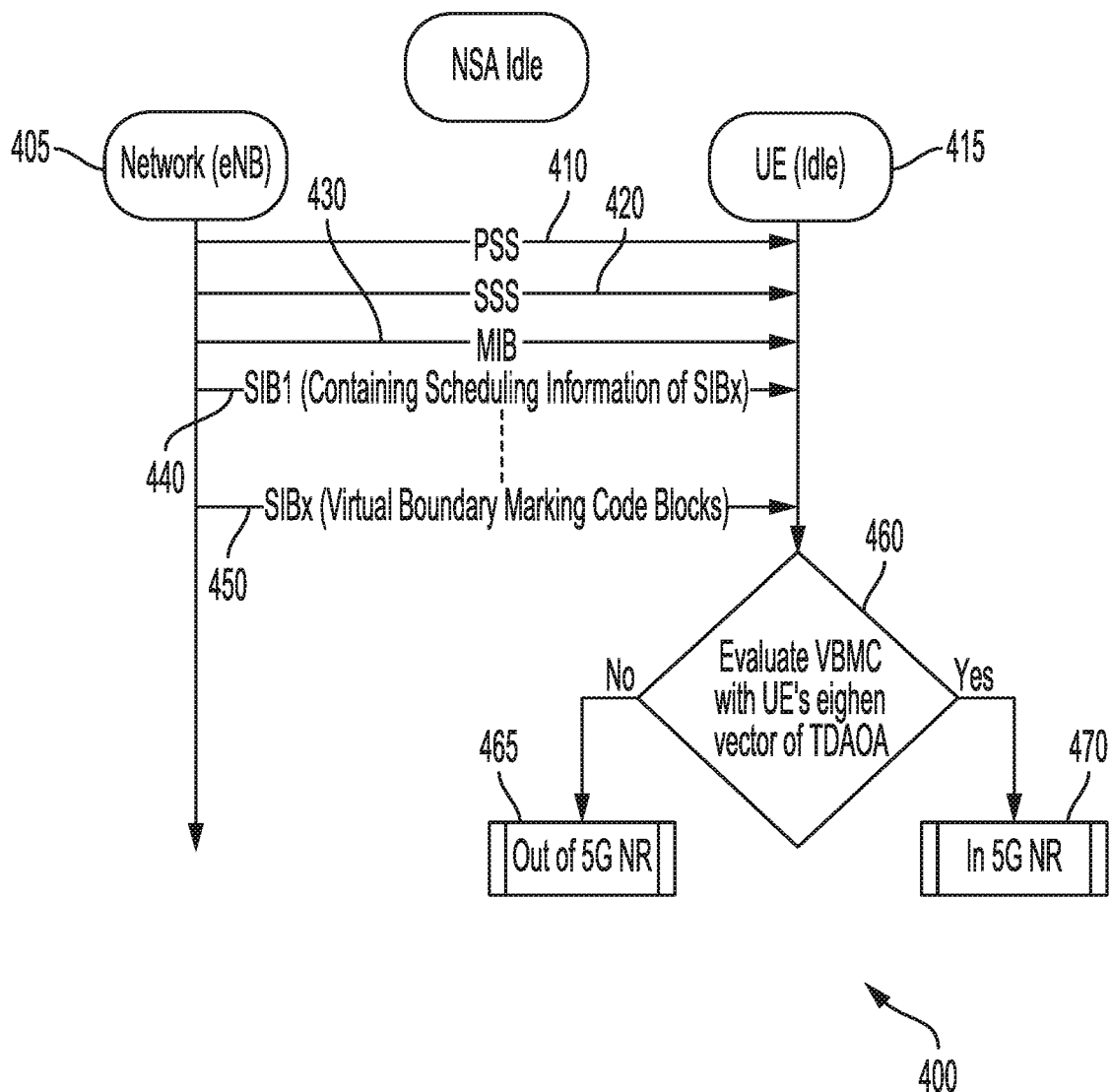
FIG. 4 illustrates an example of a wireless communications flow that supports virtual boundary marking techniques in beamformed wireless communications in accordance with aspects of the present disclosure.

FIG. 4 illustrates an exemplary non-standalone system in idle state 400. The network may broadcast NR primary synchronization signal (PSS) 410 which provides the UE with the radio frame boundary information; NR secondary synchronization signal (SSS) 420 which provides the UE with subframe boundary information; and NR master information block (MIB) 430 which includes necessary parameters for $SI_1$. As illustrated, the network transmits System information block 1 information which may contain scheduling information of SIBx, where SIBx carries virtual boundary marking code blocks 440. In other words, the network may transmit an already existing SIB comprising scheduling information of SIBx. Alternatively, the network may transmit an NR SIBx comprising virtual boundary marking code blocks (VBMCB). A UE receiving this information may then evaluate VBMCB 460 based on the UE eigen vector of TDAOA. At 465, the UE may determine it is out of 5G NR coverage, or at 470, the UE may determine it is in 5G NR coverage. In aspects of disclosed examples, a matrix codeblock may have varying sizes, depending on a resolution angle.

Figure 5:
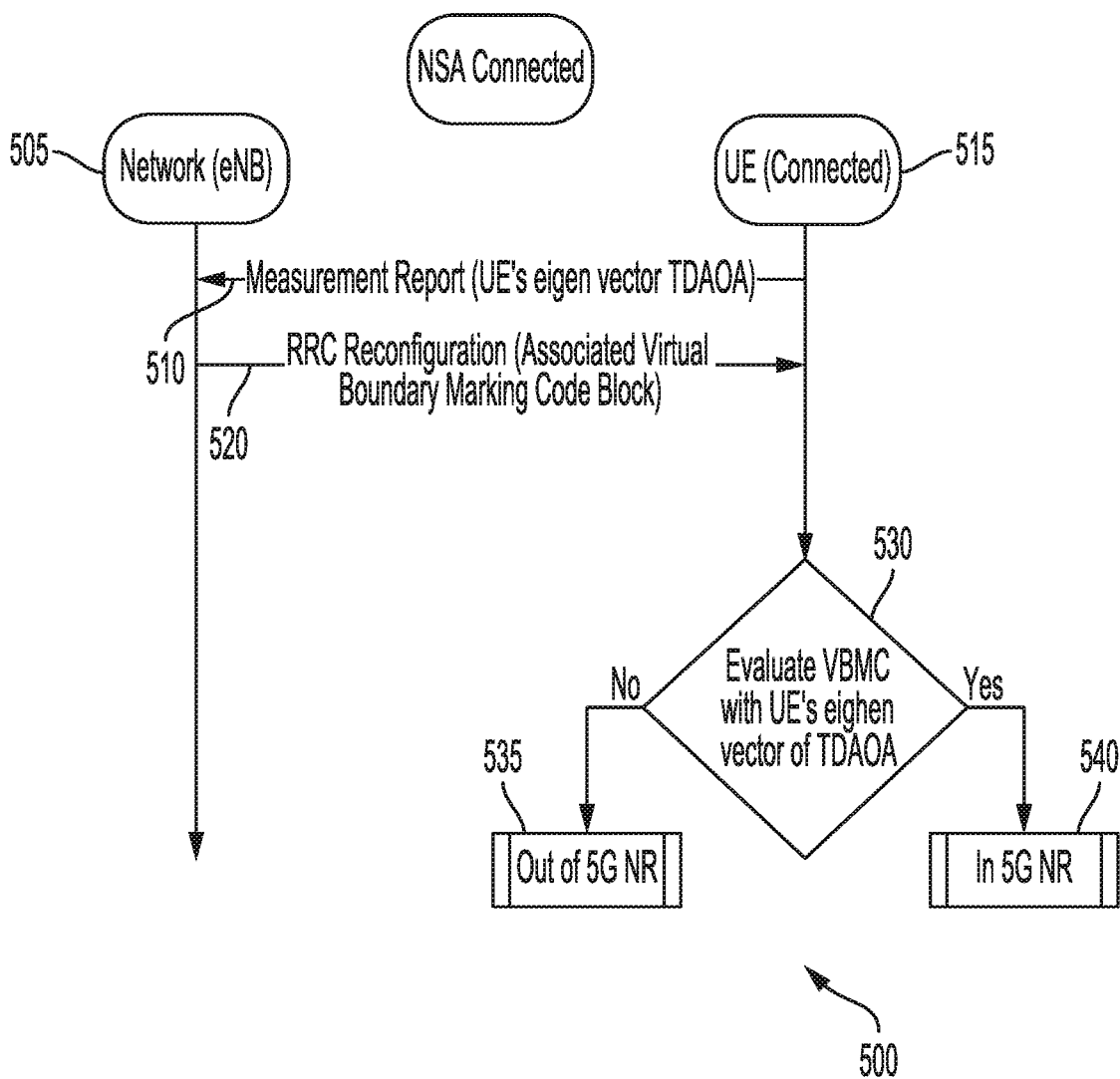
FIG. 5 illustrates an example of a wireless communications flow that supports virtual boundary marking techniques in beamformed wireless communications in accordance with aspects of the present disclosure.

FIG. 5 illustrates an exemplary non-standalone system in connected state 500. As illustrated, a UE in connected state sends a measurement report to a network (eNB). The measurement report may comprise UE eigen vector TDAOA measurements, 510. These measurements may be used by the network to improve the an eigen vector matrix. The network may then update its VBMCB immediately and send the updated VBMCB to the UE (real time updates) in an RRC reconfiguration message 520. In this example, the network continuously learns and sends real time updates to the UE. At 530, the UE evaluates VBMCB with the UE eigen vector of TDAOA. The UE thus determines the UE is out of 5G NR coverage at 535 or determines the UE is within 5G NR coverage at 540.

In aspects of disclosed examples, the network continuously learns from the UE. In some examples, it may be assumed there are several UEs in a network, all sending measurement reports at a particular TDAOA, angle of azimuth, and angle of elevation. The network continues to learn and improve associated metrics based on this information. The updated matrix information is communicated to a plurality of UEs in the system. Thus, the network becomes more robust through a lifetime of learning in connected mode. In such systems, a UE is able to decode associated flags relatively quickly and in turn decisions to camp or not camp on a 5G network are made more efficiently.

Figure 6:
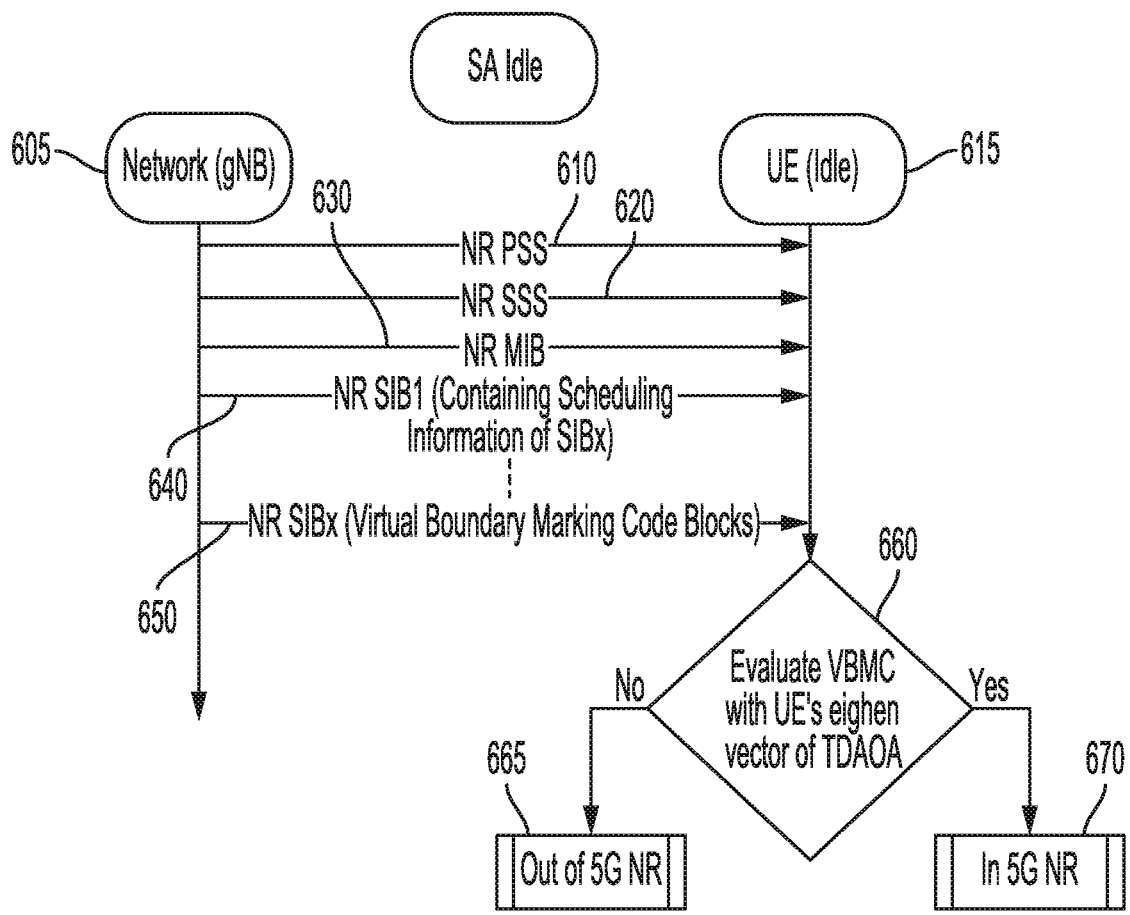
FIG. 6 illustrates an example of a wireless communications flow that supports virtual boundary marking techniques in beamformed wireless communications in accordance with aspects of the present disclosure.

FIG. 6 illustrates an exemplary standalone system in idle state 600. In standalone mode, there is no 4G anchor. The network may broadcast NR PSS 610, NR SSS 620 and NR MIB 630. System information block information is also transmitted. This may be an already existing $SIB_1$ 640 comprising scheduling information of SIBx or an NR SIBx 650 comprising VBMCB. A UE receiving this information may then evaluate VBMCB 660 based on the UEs eigen vector of TDAOA. At 665, the UE may determine the UE is out of 5G NR coverage or at 670, the UE may determine it is within 5G NR coverage.

In some examples, a UE may decode a code block and read the flag type e.g. a UE may detect a simple flag based on the variables i, j, k in the matrix. In some examples, service layer flags may be enabled, e.g QoS attributes may be included in a flag. Available services may be included in a flag as well.

Figure 7:
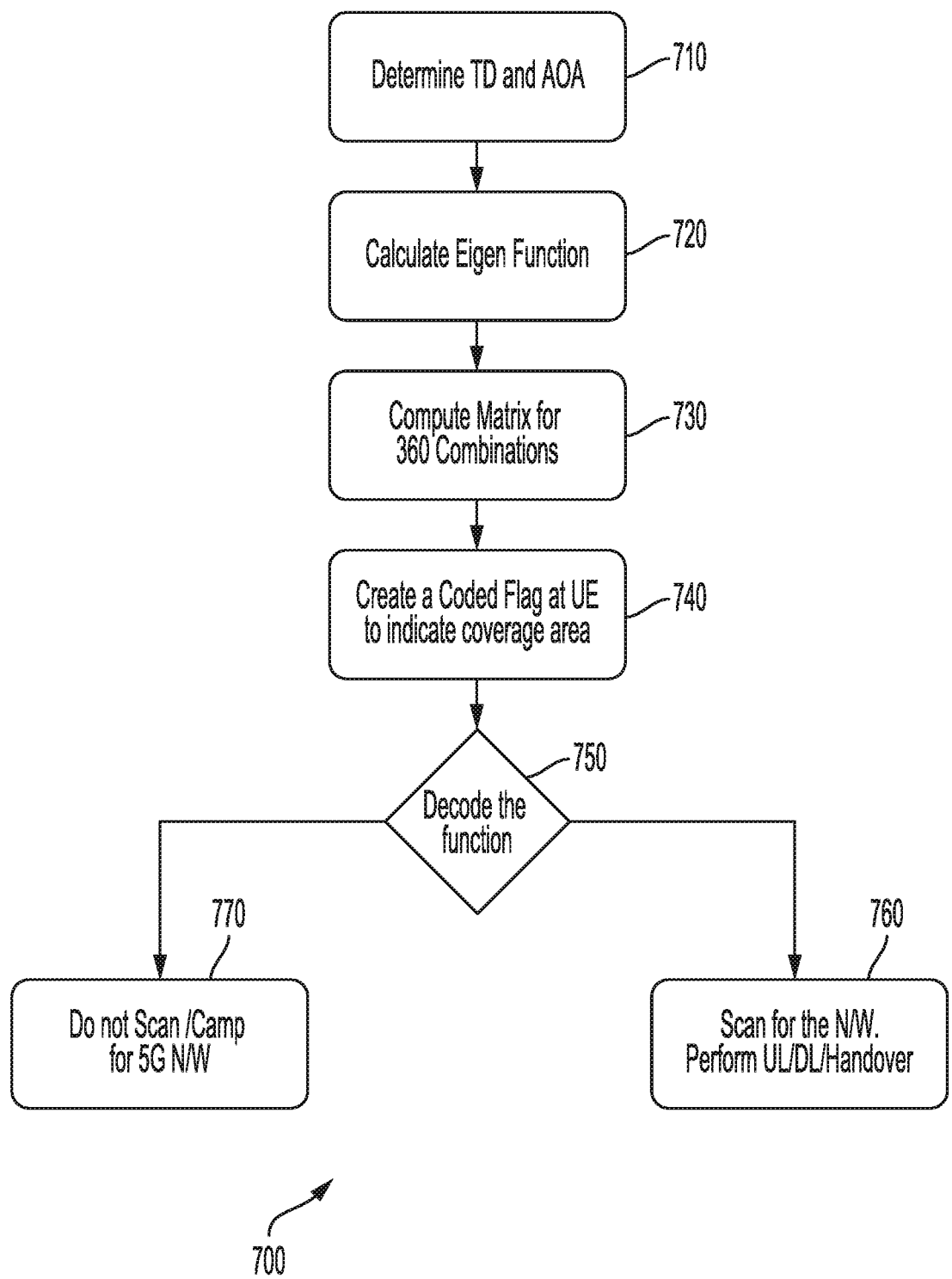
FIG. 7 illustrates an example of a wireless communications flowchart that supports virtual boundary marking techniques in beamformed wireless communications in accordance with aspects of the present disclosure.

FIG. 7 illustrates an exemplary process 700 at a UE. A UE may determine TD and AOA at 710. The UE then calculates an eigen function at 720. The UE may compute a matrix for 360 combinations at 730, then at 740, create a coded flag at UE to indicate coverage area. The UE decodes the function at 750 then decides not to scan for or camp on a 5G network at 770; or to scan for the network or perform UL/DL/ handover at 760.

Figure 8A:
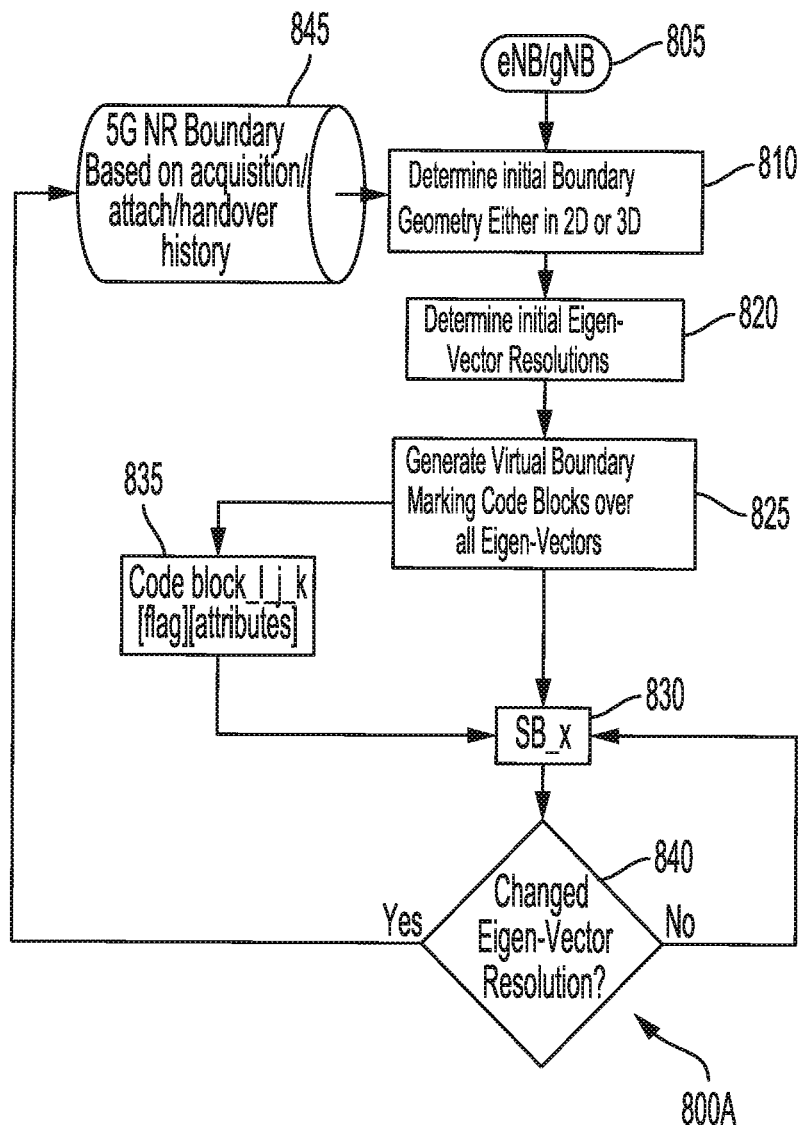
FIGS. 8A and 8B illustrate examples of wireless communications flowcharts that supports virtual boundary marking techniques in beamformed wireless communications in accordance with aspects of the present disclosure.

FIG. 8A is an examplary process flow 800*a* for a gNB in accordance with disclosed examples. As illustrated, the network determines an initial boundary geometry in 2D or 3D at 810. The network may then determine initial eigen vector resolutions at 820. At 825 the network generates virtual boundary marking code blocks over all eigen vectors. In an example, code blocks may be i, j, k flags or attributes. In block 830, SIBx is determined. If eigen vector resolution changes at 840, the 5G boundary is based on acquisition/attach history handover 845. If eigen vector resolution does not change at 840, the process returns to 830.

Figure 8B:
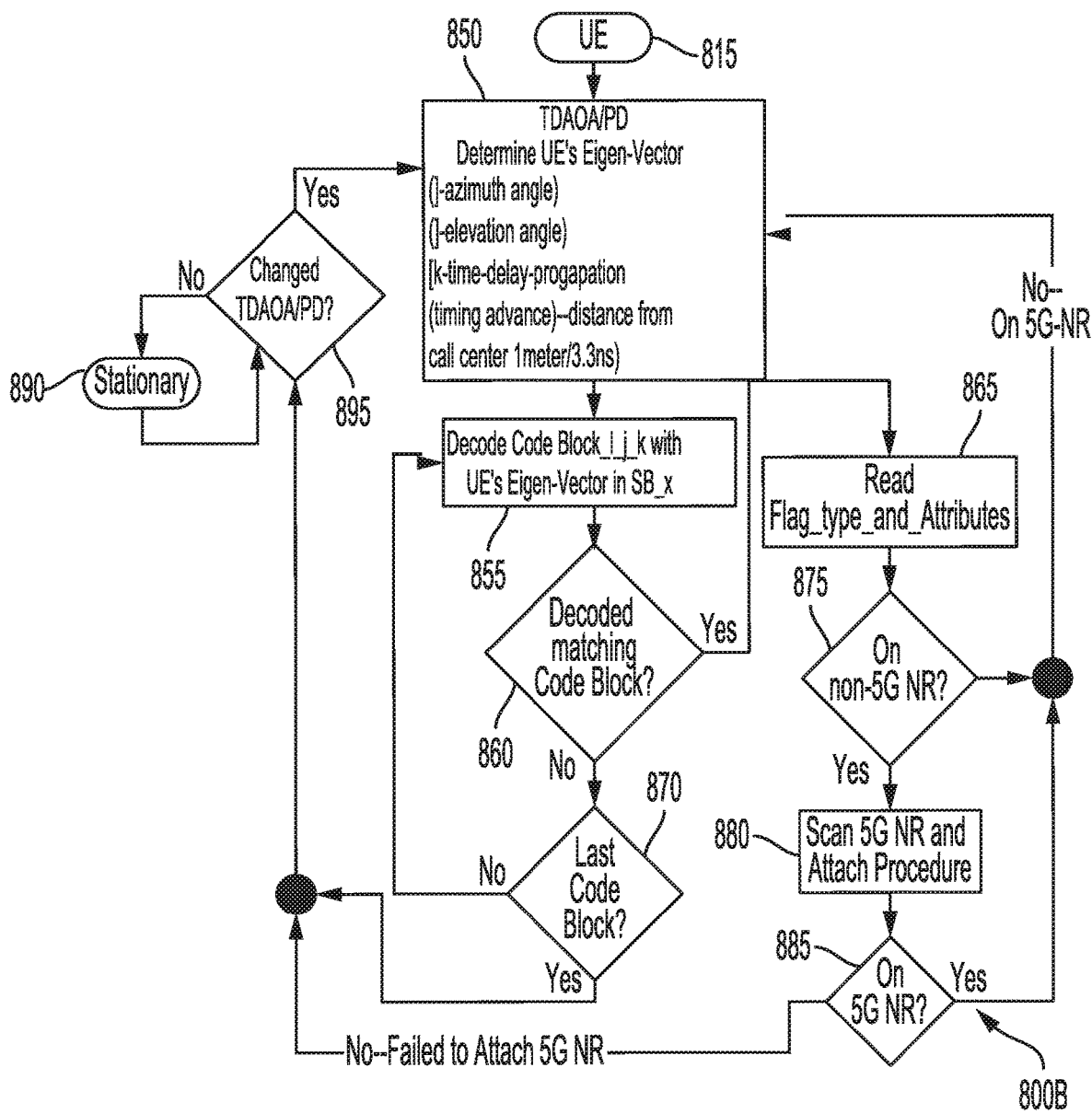

FIG. 8B is an examplary process flow 800*b* for a UE in accordance with disclosed examples. As illustrated, at 815, a UE may determine its eigen vector based on azimuth angle, elevation angle, propagation time delay, or timing advance. At 855 the UE may decode code blocks i, j, k, with the UEs eigen vector in SIBx. If decoding matches code block at 860, then the UE may read flag type and attributes at 865. If the UE does not decode a matching code block, UE determines whether it is the same as the last code block at 870. If not, UE returns to 855 and decodes code block i, j, k with UEs eigen vector in SIBx. At 870 if it is the same as the last code block, UE determines whether TDAOA/PD changed at 895. If not, it is assumed stationary. If it is changed, then UE process returns to 850. Referring back to 875 if UE determines it is on a non-5G NR, it may scan 5G NR and begin attach procedure at 880. If UE attaches to 5G NR, it may return to 850. If attach fails, it may return to 895.

Figure 9:
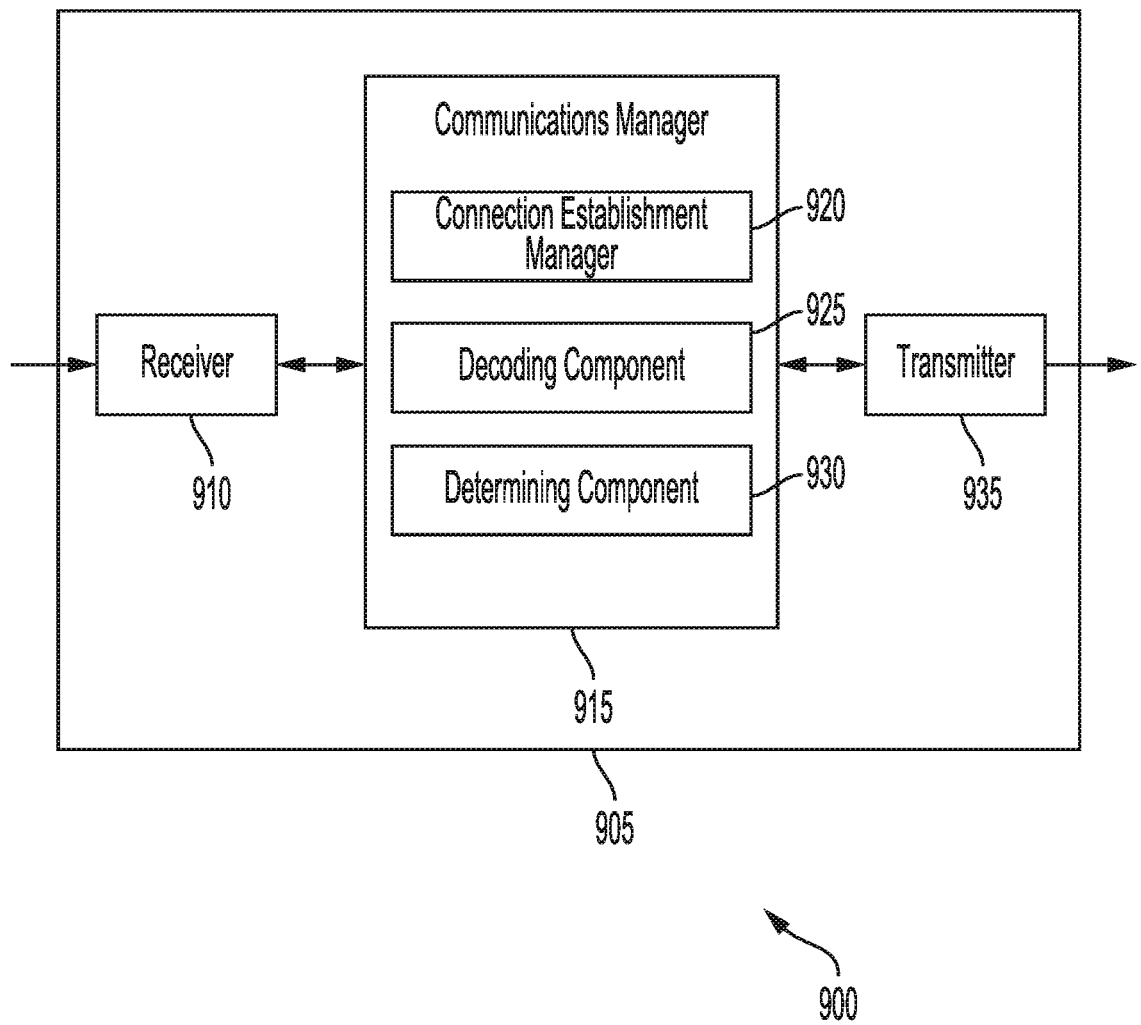
FIG. 9 shows a block diagram of devices that support virtual boundary marking techniques in beamformed wireless communications in accordance with aspects of the present disclosure.

FIG. 9 shows a block diagram 900 of a device 905 that supports virtual boundary marking techniques in beamformed wireless communications in accordance with aspects of the present disclosure. The device 905 may be an example of aspects of a UE 115 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to virtual boundary marking techniques in beamformed wireless communications, etc.). Information may be passed on to other components of the device 905. The receiver 910 may be an example of aspects of the transceiver 1020 described with reference to FIG. 10. The receiver 910 may utilize a single antenna or a set of antennas.

The communications manager 915 may include a connection establishment manager 920, a decoding component 925, and a determining component 930.

The connection establishment manager 920 may establish a connection with a base station via one or more transmission beams and receive configuration information indicative of a base station virtual boundary.

The decoding component 925 may decode configuration information including VBMCB information.

The determining component 930 may determine to establish communications with a base station within a virtual boundary geometry.

The transmitter 935 may transmit signals generated by other components of the device 905. In some examples, the transmitter 935 may be collocated with a receiver 910 in a transceiver module. For example, the transmitter 935 may be an example of aspects of the transceiver 1020 described with reference to FIG. 10. The transmitter 935 may utilize a single antenna or a set of antennas.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Figure 10:
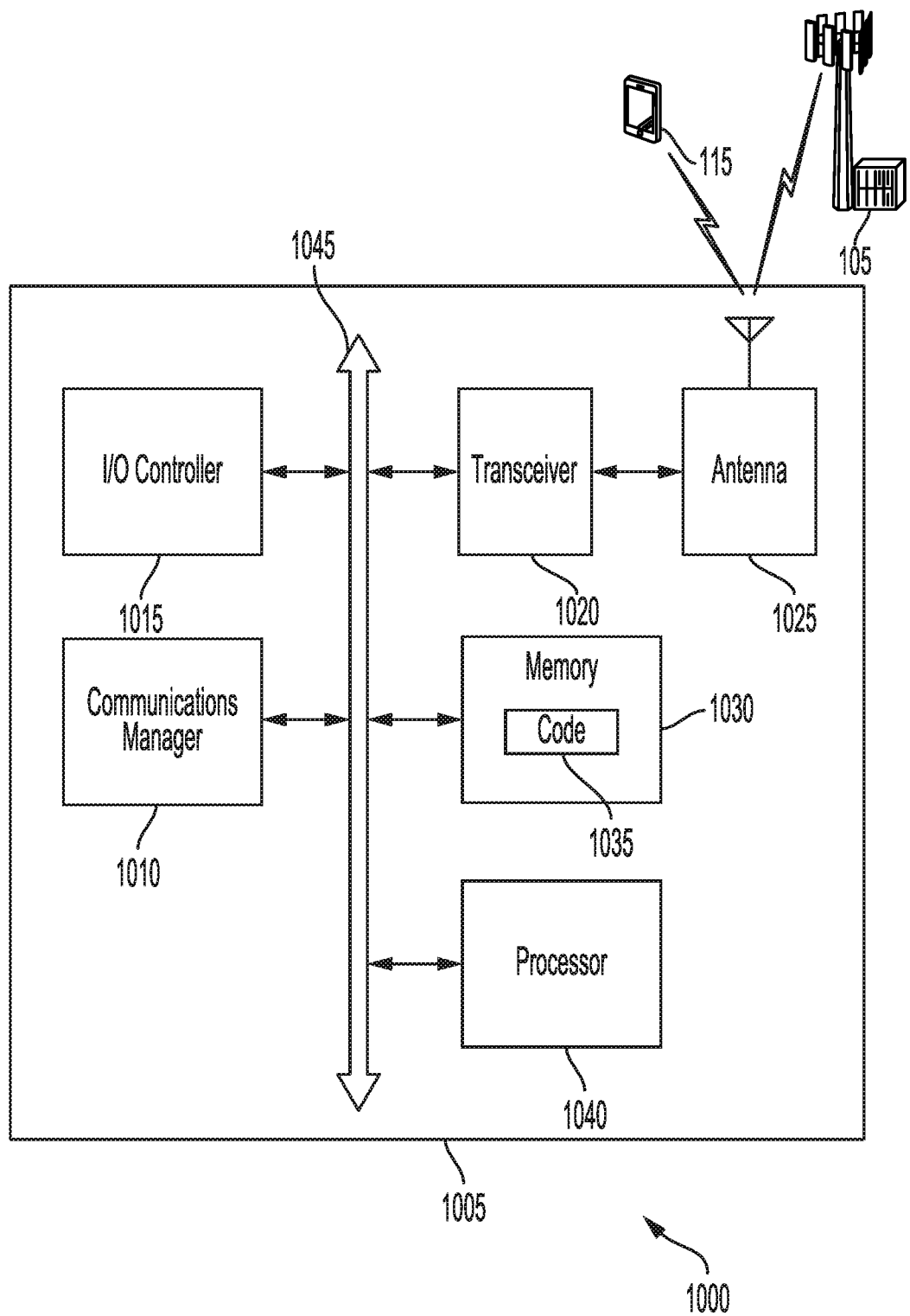
FIG. 10 shows a diagram of a system including a device that supports virtual boundary marking techniques in beamformed wireless communications in accordance with aspects of the present disclosure.

FIG. 10 shows a diagram of a system 1000 including a device 1005 that supports virtual boundary marking techniques in beamformed wireless communications in accordance with aspects of the present disclosure. The device 1005 may be an example of or include the components of device 905, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may establish a connection with a base station via one or more transmission beams, transmit key performance indicators to a base station, receive configuration information indicative of a base station virtual boundary, etc.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WIN- DOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include RAM and ROM. The memory 1030 may store computer-readable, computer-executable code 1035 including instructions that, when executed, cause the processor to perform various functions described herein. In some cases, the memory 1030 may contain, among other things, a BIOS which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting beam update techniques in beamformed wireless communications).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
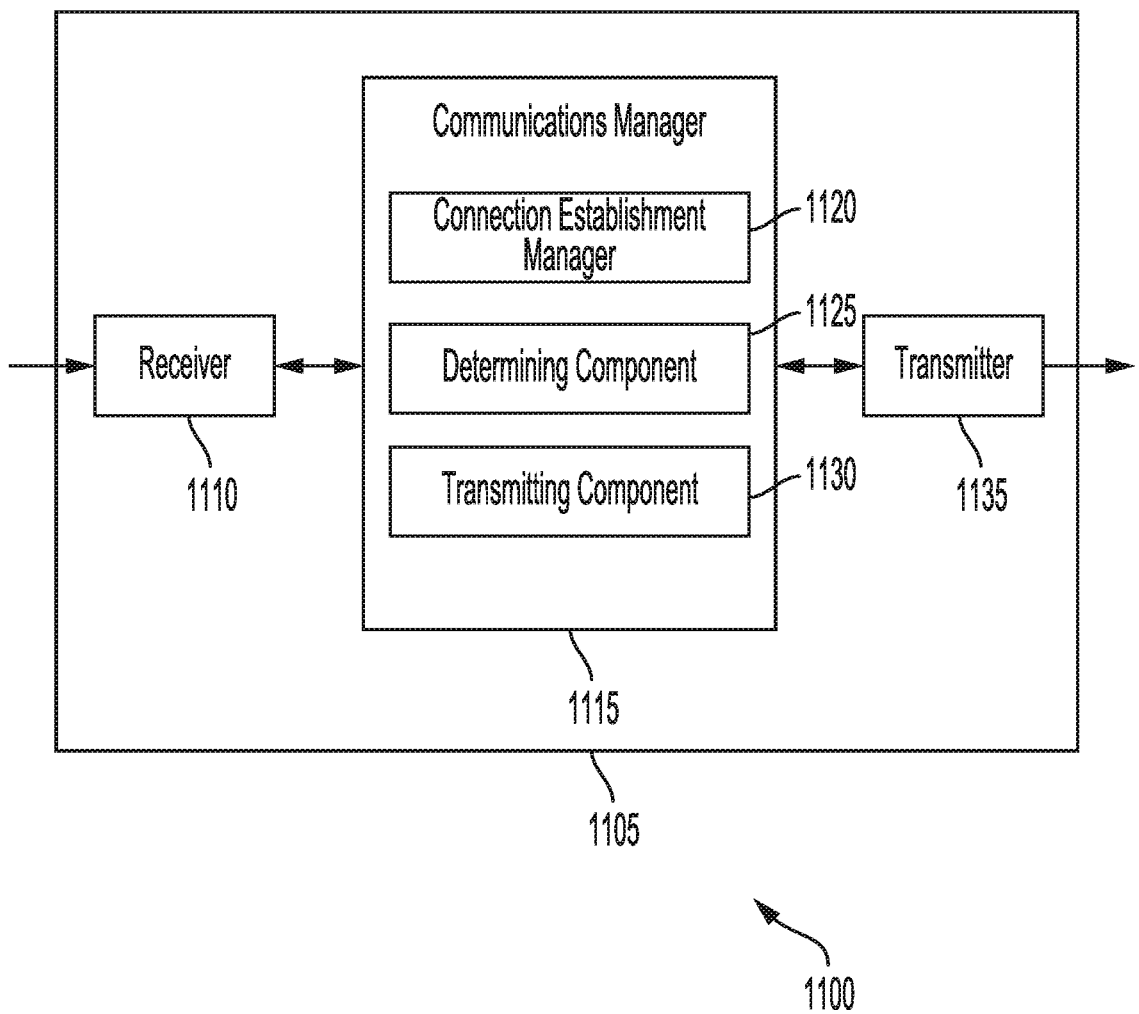
FIG. 11 shows a block diagram of a device that supports virtual boundary marking techniques in beamformed wireless communications in accordance with aspects of the present disclosure.

FIG. 11 shows a block diagram 1100 of a device 1105 that supports virtual boundary marking techniques in beamformed wireless communications in accordance with aspects of the present disclosure. The device 1105 may be an example of aspects of a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to virtual boundary marking techniques in beamformed wireless communications, etc.). Information may be passed on to other components of the device 1105. The receiver 1110 may be an example of aspects of the transceiver 1220 described with reference to FIG. 12. The receiver 1110 may utilize a single antenna or a set of antennas.

The communications manager 1115 may include a connection establishment manager 1120, a determining component 1125, and a generating component 1130.

The connection establishment manager 1120 may establish a connection with a UE via one or more transmission beams.

The determining component 1125 may receive, from the UE, key performance indicators, and may determine virtual boundary geometry and eigen vector information.

The transmitting component 1130 may transmit virtual boundary marking code blocks to the UE.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1220 described with reference to FIG. 12. The transmitter 1135 may utilize a single antenna or a set of antennas.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Figure 12:
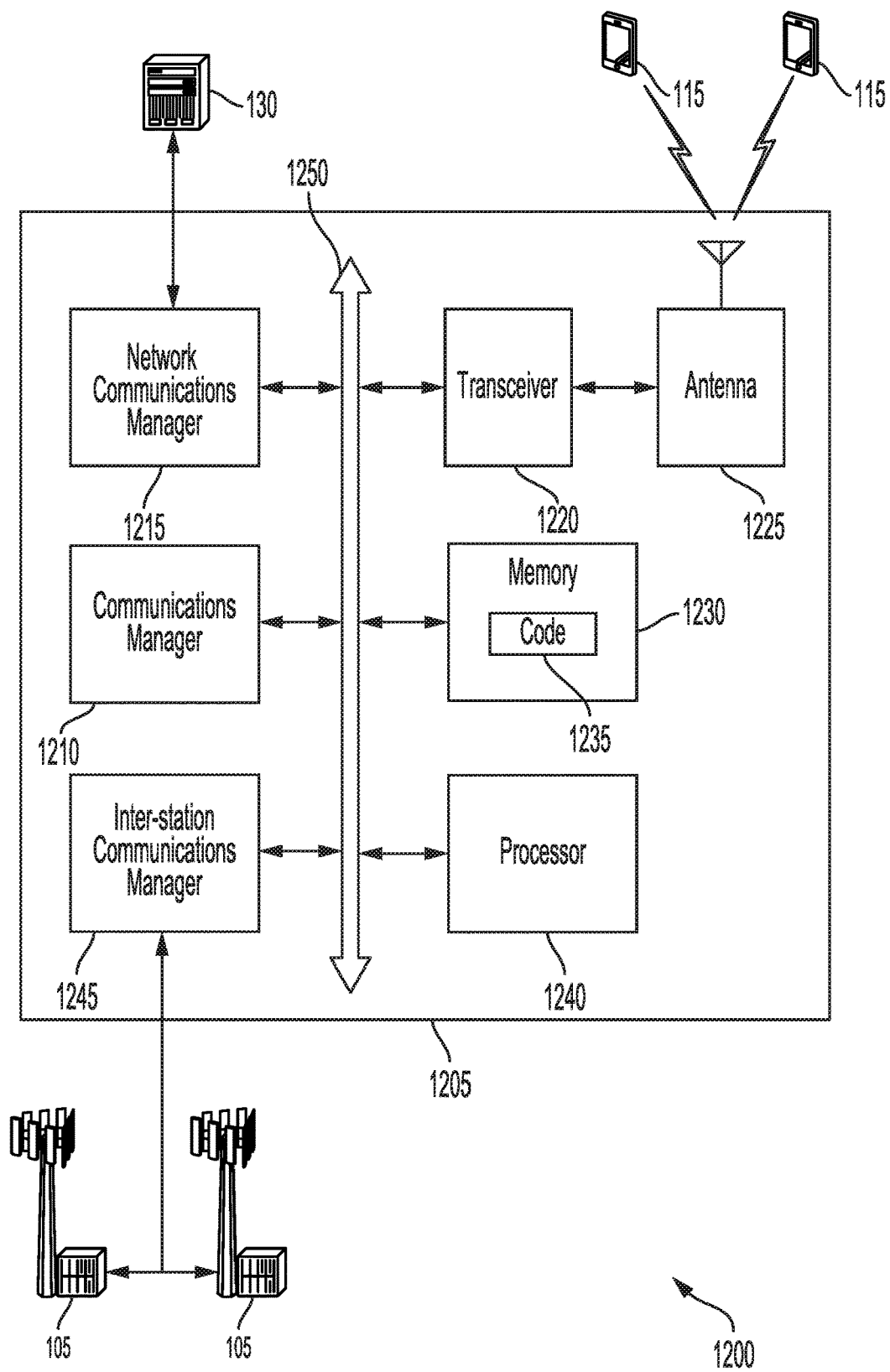
FIG. 12 shows a diagram of a system including a device that supports virtual boundary marking techniques in beamformed wireless communications in accordance with aspects of the present disclosure.

FIG. 12 shows a diagram of a system 1200 including a device 1205 that supports virtual boundary marking techniques in beamformed wireless communications in accordance with aspects of the present disclosure. The device 1205 may be an example of or include the components of device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may establish a connection with a UE via one or more transmission beams, receive, from the UE, key performance indicators, etc.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting virtual boundary marking techniques in beamformed wireless communications).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various virtual boundary marking techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
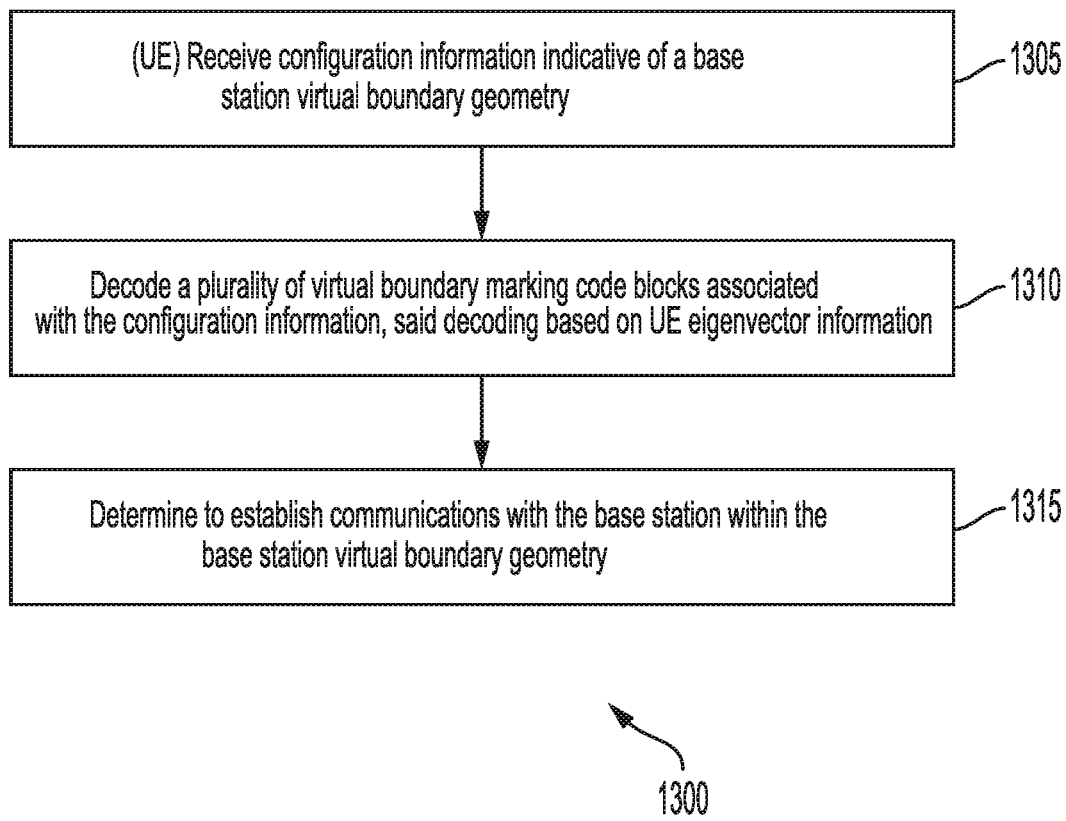
FIGS. 13 and 14 show flowcharts illustrating methods that support virtual boundary marking techniques in beamformed wireless communications in accordance with aspects of the present disclosure.

FIG. 13 shows a flowchart illustrating a method 1300 that supports virtual boundary marking techniques in beamformed wireless communications in accordance with aspects of the present disclosure. The operations of method 1300 may be implemented by a UE 115 or its components as described herein. For example, the operations of method 1300 may be performed by a communications manager as described with reference to FIGS. 9 and 10. In some examples, a UE may execute a set of instructions to control the functional elements of the UE to perform the functions described below. Additionally or alternatively, a UE may perform aspects of the functions described below using special-purpose hardware.

At 1305, the UE may receive configuration information indicative of a base station virtual boundary. The operations of 1305 may be performed according to the methods described herein. In some examples, aspects of the operations of 1305 may be performed by a connection establishment manager as described with reference to FIGS. 9 and 10.

At 1310, the UE may decode a plurality of virtual boundary marking code blocks associated with the configuration information, said decoding based on UE eigen vector information. The operations of 1310 may be performed according to the methods described herein. In some examples, aspects of the operations of 1310 may be performed by a decoding component as described with reference to FIGS. 9 and 10. In some cases, the virtual boundary marking code blocks are received in a system information block or RRC Reconfiguration message.

At 1315, the UE may determine to establish communications with the base station within the base station virtual boundary geometry. The operations of 1315 may be performed according to the methods described herein. In some examples, aspects of the operations of 1315 may be performed by a determining component as described with reference to FIGS. 9 and 10.

Figure 14:
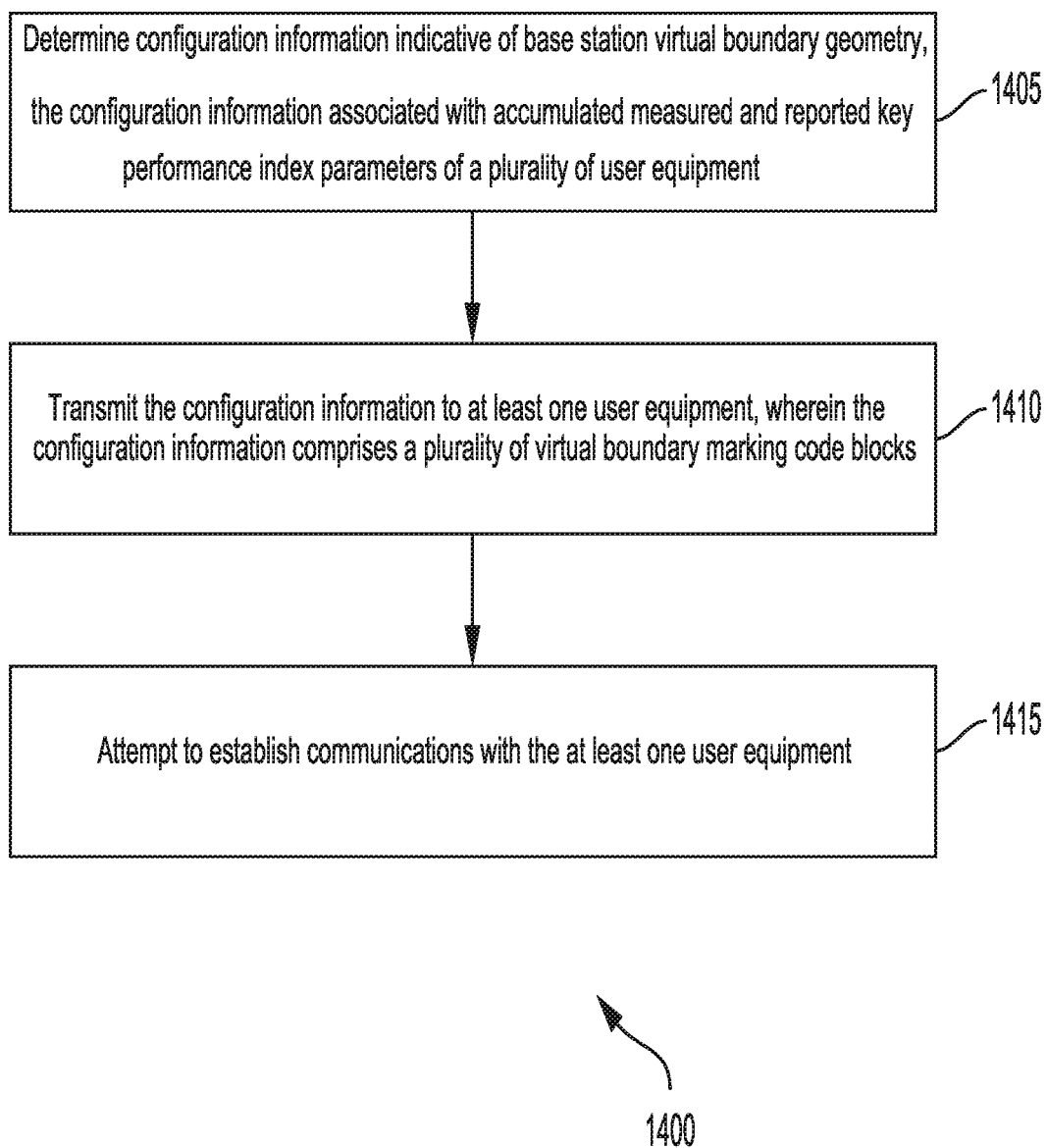

FIG. 14 shows a flowchart illustrating a method 1400 that supports virtual boundary marking techniques in beamformed wireless communications in accordance with aspects of the present disclosure. The operations of method 1400 may be implemented by a base station 105 or its components as described herein. For example, the operations of method 1400 may be performed by a communications manager as described with reference to FIGS. 11 and 12. In some examples, a base station may execute a set of instructions to control the functional elements of the base station to perform the functions described below. Additionally or alternatively, a base station may perform aspects of the functions described below using special-purpose hardware.

At 1405, the base station may determine configuration information indicative of base station virtual boundary geometry, the configuration information associated with accumulated measured and reported key performance index parameters of a plurality of user equipment. The operations of 1405 may be performed according to the methods described herein. In some examples, aspects of the operations of 1405 may be performed by a determining component as described with reference to FIGS. 11 and 12.

At 1410, the base station may transmit the configuration information to at least one user equipment, wherein the configuration information comprises a plurality of virtual boundary marking code blocks. The operations of 1410 may be performed according to the methods described herein. In some examples, aspects of the operations of 1410 may be performed by a transmitting component as described with reference to FIGS. 11 and 12. In some cases, the configuration information may be transmitted in a SIB or RRC message.

At 1415, the base station may attempt to establish communications with the at least one user equipment. The operations of 1415 may be performed according to the methods described herein. In some examples, aspects of the operations of 1415 may be performed by a connection establishment manager as described with reference to FIGS. 11 and 12.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving configuration information comprising a flag, the flag indicative of a real time base station virtual boundary geometry;
   decoding a plurality of virtual boundary marking code blocks (VBMCB) associated with the configuration information, said decoding based on UE eigenvector information; and
   determining to establish communications with the base station within the real time base station virtual boundary geometry.

2. The method of claim 1, wherein the UE eigenvector information includes at least one of azimuth angle, elevation angle, propagation time delay or distance from a cell center.

3. The method of claim 2, wherein the VBMCB is received in a System Information Block (SIB), associated with a non-standalone idle mode.

4. The method of claim 2, wherein the VBMCB is received in an RRC Reconfiguration Message associated with a non-standalone connected mode.

5. The method of claim 3, further comprising flexibly selecting between the SIB having reserved bits allocated for virtual boundary marking or a different SIB (SIBx) comprising virtual marking code blocks.

6. The method of claim 2, wherein the VBMCB is received in a System Information Block (SIB), associated with a standalone idle mode.

7. The method of claim 2, wherein the VBMCB is received in an RRC Reconfiguration Message associated with a standalone connected mode.

8. The method of claim 7, further comprising: determining to attempt acquisition of a 5G base station based on the VBMCB.

9. A method for wireless communication at a base station, comprising:
   determining configuration information indicative of a real time base station virtual boundary geometry, the configuration information associated with accumulated measured and reported key performance index (KPI) parameters of a plurality of user equipment (UE);
   transmitting the configuration information to at least one UE, wherein the configuration information comprises a plurality of virtual boundary marking code blocks, the code blocks further comprising a flag type; and
   attempting to establish communications with the at least one user equipment.

10. The method of claim 9, further comprising:
    encoding the plurality of VBMCB into a system information block (SIBx) with an accumulated UE KPI matrix information; and
    transmitting the encoded plurality of VBMCB in the SIBx in a non-standalone idle mode.

11. The method of claim 9, further comprising:
    encoding the plurality of VBMCB into an RRC Reconfiguration message with the accumulated UE KPI matrix information; and
    transmitting the encoded plurality of VBMCB in the RRC reconfiguration message in a non-standalone connected mode.

12. The method of claim 9, further comprising:
    encoding the plurality of VBMCB into a system information block (SIBx) with accumulated UE KPI matrix information; and
    transmitting the encoded plurality of VBMCB in the SIBx in a standalone idle mode.

13. The method of claim 9, further comprising:
    encoding the plurality of VBMCB into an RRC Reconfiguration message with accumulated UE KPI matrix information; and
    transmitting the encoded plurality of VBMCB in the RRC reconfiguration message in a standalone connected mode.

14. The method of claim 10, further comprising flexibly selecting between a SIB having reserved bits allocated for virtual boundary marking or a different SIB (SIBx) comprising virtual marking code blocks.

15. A method for wireless communication at a user equipment (UE), comprising:

receiving configuration information comprising a flag, the flag indicative of a real time base station virtual boundary geometry;

decoding a plurality of virtual boundary marking code blocks (VBMCB) associated with the configuration information, said decoding based on UE eigenvector information; and triggering a handover based on the real time base station virtual boundary geometry.

16. The method of claim 15, wherein triggering the handover is further based on at least one of transitioning between indoor and outdoor locations, traffic patterns or service boundary.

17. The method of claim 9, further comprising confining a base station coverage area based on the determined configuration information.

18. The method of claim 1, wherein the flag comprises at least one service parameter.

19. The method of claim 18, wherein the service parameter comprises at least one QoS attribute.

20. The method of claim 18, wherein the service parameter comprises a plurality of geo-fence parameters.

21. An apparatus for wireless communication, comprising:

a transceiver;

a memory configured to store instructions; and one or more processors communicatively coupled with the transceiver and the memory, wherein the one or more processors are configured to:

receive configuration information comprising a flag, the flag indicative of a real time base station virtual boundary geometry;

decode a plurality of virtual boundary marking code blocks (VBMCB) associated with the configuration information, said decoding based on UE eigenvector information; and determine to establish communications with the base station within the real time base station virtual boundary geometry.

22. The apparatus of claim 21, wherein the UE eigenvector information includes at least one of azimuth angle, elevation angle, propagation time delay or distance from a cell center.

23. The apparatus of claim 22, wherein the VBMCB is received in a System Information Block (SIB), associated with a non-standalone idle mode.

24. The apparatus of claim 22, wherein the VBMCB is received in an RRC Reconfiguration Message associated with a non-standalone connected mode.

25. The apparatus of claim 23, further comprising flexibly selecting between the SIB having reserved bits allocated for virtual boundary marking or a different SIB (SIBx) comprising virtual marking code blocks.

* * * * *